May 6, 1941.　　　R. W. ATKINSON　　　2,240,745
ELECTRIC CABLE
Filed Aug. 8, 1936　　　3 Sheets-Sheet 1
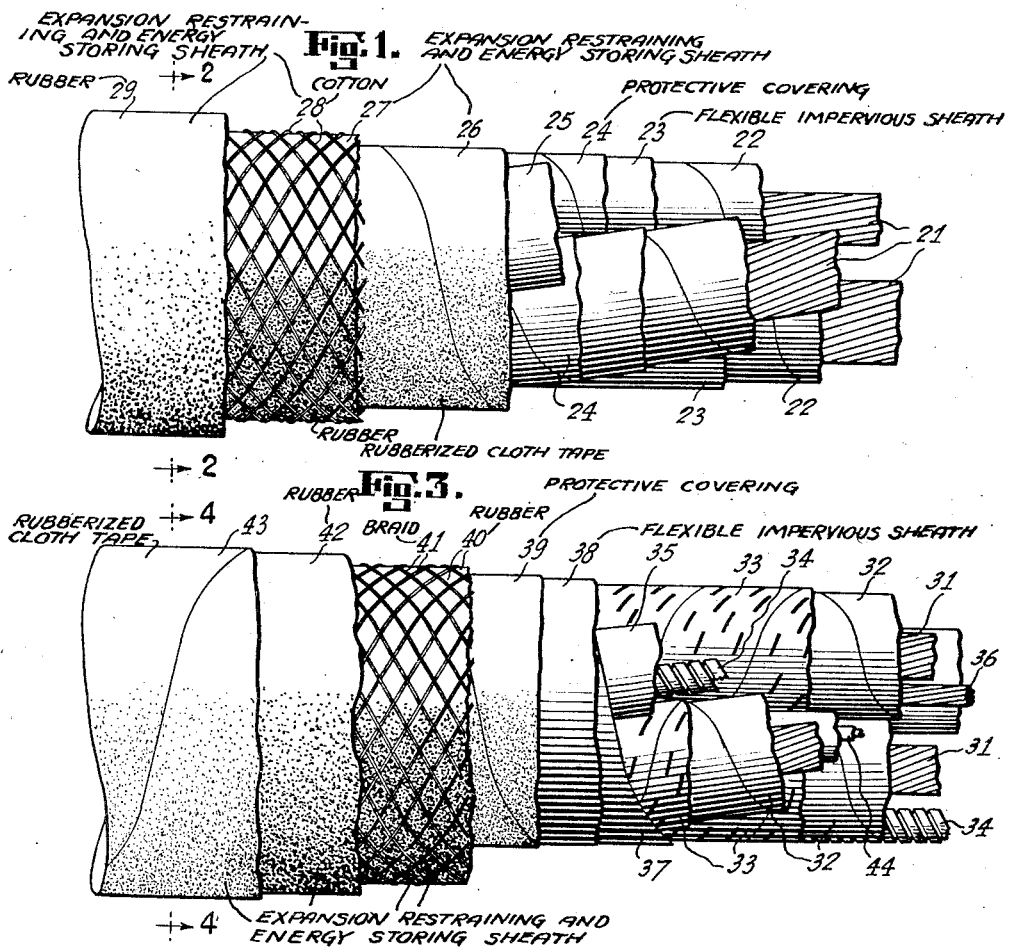
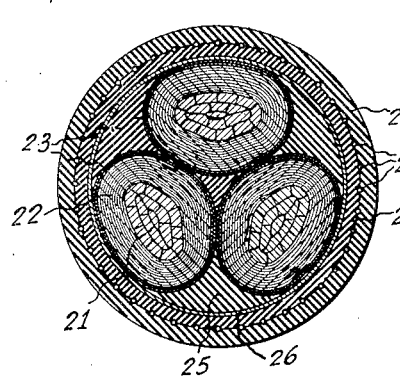
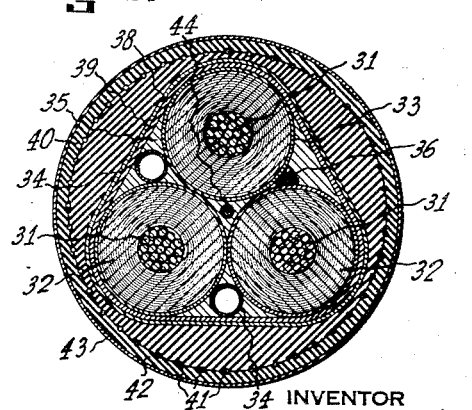
INVENTOR
RALPH W. ATKINSON.
BY George J. Schotter
ATTORNEY May 6, 1941.  R. W. ATKINSON  2,240,745

ELECTRIC CABLE

Filed Aug. 8, 1936  3 Sheets-Sheet 2

INVENTOR
RALPH W. ATKINSON.
BY
George J. Schotter
ATTORNEY

Patented May 6, 1941

2,240,745

UNITED STATES PATENT OFFICE 2,240,745

ELECTRIC CABLE

Ralph W. Atkinson, Perth Amboy, N. J., assignor to General Cable Corporation, New York, N. Y., a corporation of New Jersey Application August 8, 1936, Serial No. 94,920

19 Claims. (Cl. 174—13)

This invention relates generally to sheathed, high tension electric cables having included between the cable conductor or conductors and the sheath a body of insulating compound which fills all interstices and spaces within the sheath and which is fluid or viscid at some temperature within the normal operating temperature range of the cable. More particularly, the invention relates to cable having a radially expansible and contractible sheath which continuously maintains the insulation under pressure and prevents the formation of gaseous spaces or voids in the cable insulation upon the expansion and contraction of the insulating compound under changing conditions of manufacture, installation and service. Such cables are disclosed in my co-pending application for Cable, Serial No. 461,102, filed June 14, 1930, Patent No. 2,050,990, August 11,-1936, and my co-pending application for Cable and method of making, Serial No. 461,103, filed June 14, 1930, Patent No. 2,050,991, August 11, 1936. The present application is in part a continuation of these co-pending applications. It is an object of this invention to provide an improved cable of the type described.

The improvements provided by the present invention over those disclosed in the aforementioned copending applications reside principally in the construction of the expansion-restraining sheath. Other objects and advantages of the invention will appear hereinafter.

Illustrative embodiments of the invention selected merely for descriptive purposes are shown in the accompanying drawings, in which:

Fig. 1 is a side view of one cable construction embodying the invention, the outer elements being progressively removed to disclose the interior of the cable;

Fig. 2 is a transverse section substantially on line 2—2 of Fig. 1;

Fig. 3 is a side view of another cable construction embodying the invention, the outer elements being progressively removed to disclose the interior of the cable;

Fig. 4 is a transverse section substantially on the line 4—4 of Fig. 3;

Fig. 5 is a side view of another cable construction embodying the invention, the outer elements being progressively removed to disclose the interior of the cable;

Fig. 6 is a transverse section substantially on the line 6—6 of Fig. 5;

Fig. 7 is a side view of another cable construction embodying the invention, the outer elements being progressively removed to disclose the interior of the cable;

Fig. 8 is a transverse section substantially on the line 8—8 of Fig. 7;

Figure 9:
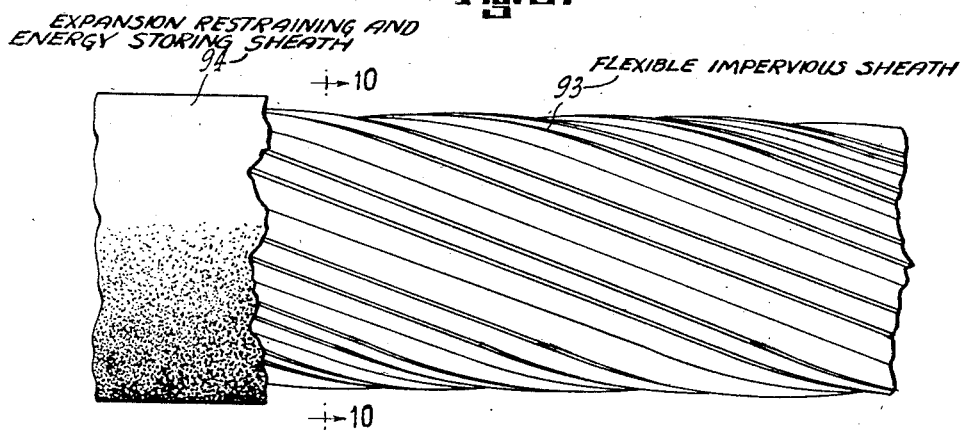
Fig. 9 is a side view of a cable construction showing a further modification, the outermost elements being progressively removed to disclose the interior of the cable.

The legends applied to the drawings are by way of illustration and not limitation.

Sheathed cable adapted for use at high voltages commonly comprises one or more conductors enveloped in porous insulating material enclosed within a flexible but substantially inelastic sheath. The insulating material generally comprises a plurality of overlying layers of helically wrapped paper tape, impregnated with an insulating compound or oil. For convenience the word "compound" will be used herein to include light oils as well as the more viscous oils and impregnating compounds. The enclosing sheath usually is made of lead or an alloy of lead. Desirably the insulating compound should fill all spaces and interstices within the sheath at all temperatures to which the cable will be subjected, so as to prevent the formation of gaseous spaces or voids.

As disclosed in my copending applications hereinabove referred to, the impregnating compound can be maintained under a positive pressure at all times, to prevent the formation of gaseous spaces, without the necessity of connecting external reservoirs if the sheath is made elastically expansible and contractible to accommodate the variation in the volume of the contained impregnating compound. These copending applications disclose cable constructions having an elastically expansible and contractible outer sheath made of a vulcanized rubber compound or some similar elastic material for continuously maintaining pressure on the cable insulation. Disclosed in Patent No. 2,050,990 is a cable construction in which there is a thin, flexible, impervious integument, for example metal, separating the elastic outer sheath and the cable insulation, while in Patent No. 2,050,991 there is disclosed a construction in which the elastic outer sheath is in direct contact with the cable insulation.

The present invention is concerned primarily with cable constructions in which there is a thin, flexible, impervious integument, for example metal, over the cable insulation which is reinforced and protected by an overlying expansion-restraining sheath of elastic material so constructed as to be capable of storing energy as the sheath is distended with rising temperatures, and of utilizing the stored energy to constrict the sheath and the impervious integument with falling temperatures.

My Patent No. 2,050,990 discloses that where the thin, flexible, impervious integument enclosing the insulated conductor or conductors is of metal, the change of volume contained within the integument should be accommodated for essentially by a change of form or shape of the inintegument without any material elongation and compression of the metal itself. Since the integument is thin and flexible, such change of form without harmful elongation or compression of the metal itself, and therefore without danger of metal fatigue, is accomplished readily by shaping the integument so that its wall flexes.

In an elastic sheathed cable which will maintain at all times a positive pressure on the contained insulating compound, a certain amount of energy is absorbed or stored and subsequently given up or restored by the sheath during the expansion and contraction cycle. This energy may be absorbed by the impervious integument itself, or by special elements constituting part of the cable sheath but designed specifically for the purpose of absorbing and giving up the energy. The necessary and desirable properties of this energy storing means will appear from the following analysis of the desired overall cable performance during expansion and contraction of the insulating compound.

The expansion restraining sheath, which includes the energy storing medium, must be capable of storing and restoring the required energy within the practical elastic limits of the material. If the energy storing material has a high modulus of elasticity the material must be arranged so that only a relatively small elongation of the material is required for a correspondingly much greater proportionate increase in the internal volume. On the other hand, if the energy storing medium has a very low modulus of elasticity, it desirably is reinforced in such a manner that a given percentage increase in the perimeter of the cable will produce a much larger percentage distortion or change in the dimensions of the energy storing medium.

It will be apparent from the foregoing discussion that the change of form of the integument upon expansion of the insulating compound must produce an elongation or distortion of the energy storing medium in such a manner as to store energy. For instance, if the energy storing medium is adapted for storing energy only by elongation under tension, then the distortion of the integument must produce an elongation of the energy storing medium. Thus, if the integument initially has an elliptical shape to permit increased volume by change toward a circular shape, merely surrounding the integument with a tension member of the same shape as the integument will not provide an energy storing sheath. In such a case, the surrounding tension medium would tend to shape toward the circular without any elongation thereof. This difficulty can be overcome, as will appear more fully hereinafter by providing suitable padding or spacing members between the integument and the surrounding tension member at the sides of the ellipse, for example to give to the surrounding tension member initially a circular shape.

In the following discussion certain numerical values will be assumed merely for convenience, and better to illustrate the order of magnitude of the quantities involved.

At the minimum operating temperature for the cable, probably in the neighborhood of zero degrees centigrade, the porous-insulation enclosing the cable conductor should be completely filled with the impregnating compound, and the compound should be under a certain minimum hydrostatic pressure, desirably never below atmospheric pressure. For example, there may be a positive pressure of the order of one atmosphere or more. A positive pressure on the compound at one atmosphere means an absolute pressure of two atmospheres. When the cable is heated, either in the course of normal operation or because of seasonal change of temperature, there will be an increase in the volume of the impregnating compound. While the dimensional changes of the other materials present, including the conductor and the paper insulation, must be taken into account in any precise analysis, these are unimportant relative to the volume change of the impregnating compound and need not be considered in the present general analysis.

At the maximum operating temperature for the cable, probably in the neighborhood of 60 degrees centigrade, the increase in volume of the conductor insulation will be in the neighborhood of 2%, requiring an increase in the sheath diameter of approximately 1%. The maximum elastic expansion of available metals is of the order of one or two-tenths of one percent. Hence any round cylindrical tube of metal, such as the customary lead sheath, would be stretched far beyond its elastic limit, and on cooling of the cable would not return to its original size by its own elastic contraction. Therefore, when the cable cools the space within the sheath will be greater than is required for the fluid and solid materials contained within the sheath. Consequently, the hydrostatic pressure on the impregnating compound will fall to the order of the vapor pressure of the compound or of its absorbed gases, and "voids" will occur. These voids are spaces filled only with vapor or low pressure gases evolved from the compound.

To prevent the formation of these voids the sheath should return to its original dimensions upon the cooling of the cable, and should maintain the compound under a positive pressure approaching the original pressure at the lowest temperature. More specifically, after a large number of such temperature cycles a final condition should be reached where the cycles are definitely recurring, such that the conditions at the end of one cycle are the same as at the beginning of that cycle, and such that a certain desirable hydrostatic pressure is imposed on the compound. This pressure may be somewhat lower than the original pressure, say 1½ atmospheres at a cable temperature of zero degrees centigrade, as compared to the initial pressure of two atmospheres at that temperature.

When the sheath is expanded by the increase in the volume of the contained materials work is performed on the sheath which it must absorb or store. If the increase of pressure during this expansion is disregarded, this energy in foot pounds is equal to the pressure, in pounds per square inch, multiplied by the volume of the cable, expressed in cubic inches, and the percentage of expansion, all divided by 12. As an illustrative example, a 3 inch diameter cable having a 2% increase in volume and at 1½ atmospheres absolute pressure, will require an energy absorption per foot of cable of 1.06 foot pounds. In this calculation the energy storage is calculated on the basis of the positive pressure, that is 7½ pounds per square inch, because the energy developed by the expansion will in part be taken care of by the work performed in expanding against atmospheric pressure.

There are three general types or classes of elastic materials capable of storing a sufficient amount of energy, but somewhat different mechanical arrangements are required for the different materials to insure storage of the necessary energy within the ranges of their effective elastic limits. These three types of materials are metals, fibrous materials and rubber compounds. Of these, the metals are the least efficient per unit volume because of their high modulus of elasticity. Either ferrous or non-ferrous metals may be used, and one of the cables hereinafter described employs metal wires for purposes of energy storage. Fibrous materials such as string and tape come next in volume efficiency, being approximately twice as effective as the metals per unit volume. Because of the rather wide range of characteristics of both types there actually is an overlap in volume efficiency, but the ratio two gives an idea of the general relationship. Most efficient of all are the rubber compounds. As rubber can be used through a wide range of stretch or compression its volumetric efficiency is many times as great as that of the fibrous or metallic material. The term "rubber" is used broadly in this specification and the appended claims to include other materials having elastic characteristics comparable to those of rubber.

The numerical value of the modulus of elasticity of the elastic material employed has an important bearing upon the ease and method of utilizing its energy storage characteristics. The modulus of the metals is very high, whereas the modulus of rubber is very low, and the modulus of fibrous material is intermediate. I have found that by suitably combining two or three of these types of material an efficient expansion-restraining sheath can be secured.

In the case of a metal, the amount of energy which can be absorbed or stored, within its elastic limit and where the stretch is proportional to the force, is equal to one-half the square of the final stress in pounds per square inch divided by the modulus of elasticity. For example, a certain steel may have a tensile strength up to its elastic limit of 30,000 pounds per square inch, and a modulus of elasticity of 30,000,000 in which case 15 inch-pounds or 1¼ foot-pounds of energy can be stored per cubic inch of metal. Thus, .85 cubic inch of such steel would be required to absorb or store the 1.06 foot-pounds of energy per foot of cable, above calculated.

This calculation of the amount of steel required does not take into account two important factors. The first is that to provide the initial pressure of ½ atmosphere at zero degrees centigrade, which has been assumed for this illustration, the elastic envelope must be elongated and some energy stored initially in the steel. The second is that as the volume increases and the stress in the steel increases, the pressure does not remain constant but increases in direct proportion to the increase in volume. Therefore, it is necessary to make some further assumptions and calculations to determine more closely what actually happens when an elastic metal, in this case steel, is used as the energy storing medium.

Let it be assumed, as before, that the positive pressure at minimum volume is ½ an atmosphere, and that the expansion-restraining sheath is designed to provide a positive pressure of 1 atmosphere at maximum volume corresponding to a 1% increase in sheath diameter. Then if the energy storing medium has an elongation proportional to the stress, that is the stress is within the elastic limit, the pressure at any intermediate volume will be proportional to the change in volume, and the amount of energy stored in the steel will be proportional to the square of the hydrostatic pressure. Thus, in the assumed case, at maximum volume the pressure is two times the initial pressure and there will be four times as much energy stored in the steel as at minimum volume.

With the stress in the steel at maximum volume assumed to be 30,000 pounds per square inch, the stress at minimum volume will be ½ of that, or 15,000 pounds per square inch. Thus, the total energy stored in the steel at one atmosphere positive pressure will be twice the amount calculated above, or 2.12 foot-pounds of energy per foot of cable, which would require 1.7 cubic inches of steel per foot of cable for absorption of the energy.

The amount of steel required for the energy absorbing medium is reasonable, being slightly less than ½ pound per foot of cable, but the problem remains of disposing the metal in such a way that it will be used efficiently for storing and restoring the energy. If the steel is applied simply as a round tube, its full tensile strength will be developed with only a fraction of the required amount of expansion, as pointed out hereinabove. In other words, the modulus of elasticity of steel is much too high to permit its use in this, the simplest manner. However, there are various ways in which the steel may be used effectively as the energy storing medium, and one of the simplest of these consists in using the steel in the form of small wires disposed helically about the cable.

The 1.7 cubic inches of steel required per foot of cable in the illustration above means that the cross section of the steel will be .142 square inch or 180,000 circular mils. If we divide this into eight wires, each wire will have a cross section 22,500 circular mils or a diameter of .15 inch, if round. These wires are disposed helically around the cable, equally spaced each from the other. Under these conditions a change of 1% in the perimeter of the sheath does not require a change of length of the wires of 1%. In this illustrative example the amount of expansion of the wire in a change from ½ atmosphere to 1 atmosphere cable pressure corresponds to a change in stress in the metal from 15,000 pounds to 30,000 pounds. On the basis of the assumed modulus of elasticity of 30,000,000 this represents a change of length of $\frac{1}{20}$ of 1%. Therefore, the lay of the steel wires should be made so that a change in perimeter of the sheath of 1% corresponds to a change in the length of the steel wires of $\frac{1}{20}$ of 1%, or in the ratio of 20 to 1.

For a first approximation, a proportional increase in the length of the wires is equal to the proportional increase in the perimeter of the sheath multiplied by $$\left(\frac{\pi d}{l}\right)^2$$

where $\pi d$ is the perimeter and $l$ is the length of lay. Thus if the length of lay is 4.5 (which is approximately the square root of 20) times the perimeter, the elongation of the wires will be 1/20th as much proportionately as will be the increase in the perimeter of the sheath. This means that the length of lay of the wires will be about 14 times the diameter of the cable, which is approximately twice as great as the length of lay would be for wires used for armoring purposes. While this length of lay is greater than usual for cable armoring wires, nevertheless it is reasonably within the range of practical application, although an outer binding may be desirable to keep the wires in place and prevent them from springing out when the cable is bent.

With the arrangement of wires above described, various interrelations of the stresses involved may be considered. The helically disposed wires tend to twist the cable in the direction to untwist the wires, and also apply a compression tending to shorten the cable. If the area of the cable conductor is large, the conductor may adequately withstand both types of force. In that case part of the elasticity would be furnished by the conductor itself, and this could be taken into account in the design of the energy storing covering. In such a case the helically disposed wires would be under less stress and would be required to absorb less energy, permitting a reduction in the total amount of steel required. Restraint from twisting the cable can readily be applied at the ends of long lengths of cable, and the cable can be restrained at suitable points to prevent shortening.

The relation of the impervious integument to the energy storing means may also be considered. Conveniently the impervious integument will be a thin extruded lead sheath, for example of the order of $\frac{1}{32}$ to $\frac{1}{16}$ of an inch in thickness. Desirably the thin lead sheath is protected to reduce danger of wrinkling and rupture when the cable is bent and during the manufacturing operation. This protective layer conveniently is a rubber faced cloth tape wrapped over the lead sheath with an intervening layer of adhesive. The cloth tape desirably will be vulcanized to the lead sheath.

The cross sectional shape of the wires employed as the energy storing medium may be other than round. Flat or oval wires will apply the compression force over a larger proportion of the sheath area than will round wires, and will cause the bending of the underlying sheath during expansion and contraction to be less localized.

If the impervious integument is not considerably out-of-round in shape, the initial increase in contained volume caused by the heating of the cable or by the introduction of insulating compound under pressure at the end of the cable will cause the integument to stretch. It would be impractical during the following expansion and contraction cycles to compress and expand the sheath, and such action would result in mechanical failure of the integument. However, where spaced, helically wrapped wires are employed as described above the action upon a reduction in volume will be a bending of the integument into a slightly corrugated form. Subsequent expansion and contraction of the sheath occurs without further elongation of the material of the sheath, but only with a bending of the corrugated wall.

If the impervious integument does not elongate and contract during the subsequent cycles the energy absorption will be entirely in the external wires, or any such other elements as may be stressed by the forces in these wires. However, if the integument itself has a certain degree of elasticity a portion of the energy absorption will be in the integument. As a practical matter the energy absorption will be divided among different elements of the cable sheath, and the storage capacity required of each is lower than it would be if the others did not absorb a part of the energy.

The use of steel has been suggested above for the pressure storing medium. Other metals may be similarly employed. The bronzes, for example, have a considerably lower modulus of elasticity, in the order of 15,000,000 to 20,000,000. Consequently a shorter lay would be used for bronze energy absorbing wires than for steel wires. With its lower modulus, a bronze having the same strength and elastic limit as steel would be able to store a larger amount of energy than would steel. Or if the bronze had a lower tensile strength that would be offset by its lower modulus.

If in the construction described above the helical wires are wound with a considerably shorter lay than described, and using a smaller number of wires, then for the same total weight of wire and based on the same internal hydrostatic pressure, the elongation of the wires will be less and a part of the energy must be absorbed in some other manner. This can be done if the impervious integument is sufficiently elastic, for example, if the impervious integument is a suitable elastic non-metallic material, or is a suitable corrugated metal wall.

If the integument is a corrugated metal wall the corrugations conveniently are made to run helically around the cable parallel to the outer wires. With such a construction bending of the cable is possible by reason of the flexing of the corrugations. Furthermore, the portions of the elastic integument between the helical wires would move in and out by the flexing of the metal as the internal volume changes. In such a case the energy storage could be supplied by a suitable elastic medium over the corrugated metal integument.

If the impervious integument, instead of being of metal, is itself made of an oil-resistant rubber, or of a non-metallic oil resistant material such as "Thiokol" or "Duprene," it may itself furnish a part or all of the energy storage. In such a case the helical wires may be used to reduce the stress in the integument or the energy absorbing medium if the latter has too low a modulus of elasticity for efficient operation, or too low a strength to withstand the force without undesired distortion.

From the standpoint of modulus of elasticity, steel is at one extreme of the available elastic materials and rubber-like substances are at the other extreme. With the latter substances there is no simple numerical value which can be assigned as the modulus in the same sense that the term is used in connection with steel and other metals, and the term must be defined specifically with reference to the manner of use.

For example, if a particular rubber-like substance be elongated a few percent under tension and the modulus be defined as the stress per unit area divided by the relative elongation, the modulus will be of the order of one hundred up to several hundred. If the strain be removed in part the stress will fall off much more rapidly than would be expected from a calculation based on this modulus. In other words, the stress-strain curve with decreasing tension will not follow the curve with increasing tension. However, over a small range of stretch-variation the stress-strain curve is reproducible in two directions. The modulus which must be used is that applying to the particular stretch range which is to be used. Merely by way of example one type of rubber has a modulus of 18,000 in the range of 200 to 220% stretch, as compared with an initial modulus of about 300.

The characteristics of rubber as a medium for storing energy by tension are illustrated by the characteristics of one particular sample upon which tests have been made. A sample having an area of .1 square inch and 10 inches long between bench marks was stretched to 32 inches in length between bench marks and then released to 30 inches. The total tension on the specimen was then 80 pounds, or 2400 pounds per square inch of the stretched cross section. Further variation in the length of the stretched sample through a range of about one inch showed that it goes through a reproducible cycle. That is, the specimen can store and restore an energy of 80 inch-pounds. Since the volume of the specimen is one cubic inch, the energy storage is 80 inch pounds per cubic inch, as compared to 15 inch pounds per cubic inch calculated above for steel.

In other words the modulus is not constant over the elastic range as is the case for steel and other metals, the modulus for rubber and rubber-like materials being much higher under high tension than under low tension. The working modulus may be calculated in the following manner. The one inch change in length, which is $3\frac{1}{3}\%$ of the stretched length, corresponds to a change in tension of approximately 20 pounds, which is 600 pounds per square inch of stretched area. Since the definition of modulus is stress divided by strain, the working modulus is 600 divided by .033, or 18,000 pounds per square inch.

If rubber in this stretched condition is applied around a cable as the energy storing medium the amount of elongation of the rubber which can be effectively used is equal only to the change in perimeter of the cable. In the example above considered the increase in perimeter was taken as 1%. Thus the $3\frac{1}{3}\%$ change in length of the rubber, which can be used as far as producibility is concerned, is more than can be used practically. With the 1% stretch which can be used practically, only about 25 inch-pounds per cubic inch of rubber is available for storage purposes, but this is nearly twice the storage for steel as calculated above.

Where rubber is stretched in this manner there is a falling off of tension in the rubber with time. This change is less rapid if the rubber is protected against oxidation, but the initial tension must be great enough so that the final tension after years of life still is high enough to provide the required continuous hydrostatic pressure on the cable insulation.

In order to make the rubber more effective as an energy storing device, where the total change of dimensions required is less than can be effectively undergone by the rubber, the rubber desirably is reinforced by material of higher tensile strength. This may be done with a braid of cotton or paper or other fibrous string, or by a braid of metal. Under tension such a composite material will have an elongation due to two causes. There will be some stretch of the reinforcing material, and, especially if the braid be open, the rubber will be distorted through the openings in the braid so that the stress in the rubber will be greater than it otherwise would be for the change in length of the sheath. Thus a greater energy storage is produced in a given volume of rubber for a given elongation of the sheath than would be the case for rubber without the reinforcement.

The remaining general class of materials suitable for use as an energy storing medium comprises fibrous materials such as string. This is independent of its specifically reinforcing characteristics described above. The following specific characteristics determined from a piece of cotton string will illustrate the energy storing ability of such material.

A string .035 inch in diameter, having an area of .00096 square inch, was placed under tension and elongated 6.6%. It was found that when the elongation was varied from 6.1% to 6.6% a reproducible cycle was obtainable, the tension within this range varying from 1800 to 3000 pounds per square inch, or a geometric average tension of 2475 pounds. A cubic inch of this string would be 1040 inches long, and the variation in length between 6.1% and 6.6% stretch would be 5.2 inches. The energy storage then is 2475 multiplied by .00096 and 5.2, or 12.5 inch-pound per cubic inch. The upper limit of stress above mentioned is approximately 30% of the breaking strength of the string. The working modulus of the string therefore is 235,000 pounds per square inch.

The allowable variation of length of the string of approximately ½% mentioned above is only half of that indicated above as the percentage variation of the cable perimeter. The string therefore will be applied helically in the same manner and for the same reasons that steel wires are applied helically. However, the characteristics of the string require a much shorter lay than that required for the metals, being only about three times the cable diameter, in the illustrative example.

The modulus of the string may be varied through a rather wide range by the tightness of spinning of the thread, a shorter lay of the spun thread resulting in a lower modulus, and vice versa. However, any particular string may be adapted to the required use by applying the string to the cable with a proper helical lay.

The string or yarn fibres may be applied to the cable either in the form of a braid or wrapping of individual strings or yarns, or they may be applied in the form of a woven cloth tape. If the latter, only the lengthwise fibres or yarn will be fully effective as an energy storing medium. The total amount of fibrous material may be divided between the tape or cloth wrapping and a braid, and may be combined with rubber as the storing medium. The tape also may have other functions in addition to its energy storing function, for example as a binder, or as a protective covering over a layer of rubber.

In comparing the effectiveness of metals, rubber and fibrous string or yarn as energy, storing media it is necessary to keep in mind the percentage of total stretch which can be or is used reproducibly. The total energy which can be stored in steel has been calculated above to be 15 inch-pounds per cubic inch. Assuming that the steel will operate only between the limits of .05% and .1% stretch, in which range the effective energy storage is three quarters of 15, or 11¼ inch-pounds per cubic inch. The string described above can store about 20 inch-pounds per cubic inch from zero tension to the stress named, but because a smaller percentage of the total stretch can be used reproducibly than is the case for steel, the energy storage in the effective range is, as pointed out above, only 12.5 inch-pounds per cubic inch. Thus the total energy storage in the string is ⅓ greater than in the steel, but the effective energy storage is only about 10% greater. Similarly the value given above for rubber is to be compared with the figure of 11¼ inch-pounds for steel rather than with the figure of 15 inch-pounds.

The drawings disclose by way of example several cable constructions embodying expansion-restraining sheaths which comprise energy storing means according to the foregoing disclosure.

Figs. 1 and 2 disclose a three conductor cable construction. Three conductors 21, for example sector shaped, are each enclosed in a body of insulation 22. As illustrated the conductors are made in accordance with the inventions of the E. W. McKnight Patent No. 1,943,086, and the F. M. Potter and E. W. McKnight Patent No. 1,943,087, dated January 9, 1934. The insulation 22 conveniently is built up of overlying layers of helically wrapped paper tapes and is impregnated with a suitable insulating compound. Each insulated conductor is enclosed with a thin, flexible, impervious integument 23, for example an extruded lead sheath.

Since the impervious integuments 23 must flex and change shape as the volume of the contained insulating compound varies, the integuments desirably are made considerably thinner than lead sheaths customarily used on cables. The integuments, if extruded lead, may be of the order of 1/32 inch thick. Flexing of the integument for change of shape without stretching and compression of the metal is facilitated by reason of its initial out-of-round shape.

Each thin integument is protected against wrinkling by a protective wrapping, desirably applied as the covered conductor emerges from the lead press and before it is reeled. A coating of a "Bakelite" cement may be applied to the integument, and over that an overlapping layer 24 of friction or rubberized tape. Causing the protective wrapping to adhere to the integument reduces danger of damage to the integument.

The three conductors then are cabled together, either with or without fillers 25. If fillers are employed they may, for example, be of rubber, and should fill the valley spaces very loosely to permit flexing of the integuments 23 without severe localized bending.

Over the assembled conductors is placed an expansion restraining and energy storing sheath. In this particular illustrative embodiment the expansion restraining sheath comprises an overlapping or multiple wrapping 26 of rubberized cloth tape, a wall 27 of vulcanized rubber or similar material, an open braid 28, for example cotton string applied under tension, and an outer wall 29 of vulcanized rubber or similar material. The dimensions of these several elements and the lay and tension of the helically wrapped fibrous elements are determined in accordance with the foregoing disclosure to provide the necessary energy storing and restoring characteristics for the cable.

It will be obvious that the expansion restraining sheath may comprise additional or different elastic materials as the energy absorbing means, as set forth hereinabove. For example, the expansion restraining sheath may comprise only tightly applied rubber bands.

The rubber walls described herein may be extruded, or may comprise overlying layers of rubber applied helically under tension and subsequently vulcanized into continuous walls.

If the integuments 23 are extruded lead walls they probably will engage the paper insulation 22 rather closely, initially. When the insulating compound expands during the initial temperature cycle the integuments 23 will be stretched, the excess compound forced out of the paper 22 forming a thin layer under the inner side of each of the integuments. As this occurs the expansion restraining sheath is distended, storing energy in the elastic elements thereof. Then when the volume of compound decreases the absorbed energy is restored in constricting the integuments 23. As this occurs the integuments flex and encroach on the valley spaces between the several conductors. It is for this reason that the fillers 25, if present at all, should fit rather loosely.

Figs. 3 and 4 of the drawings disclose a three conductor cable construction in which the three insulated conductors are enclosed within a common impervious integument. The conductors 31 are each enclosed in the body of impregnated insulation 32. Each insulated conductor may be shielded, for example by means of a thin, helically wrapped metal tape 33 which closely engages the paper insulation.

The insulated and shielded conductors are cabled together, and conveniently may have an extra conductor 36 in one of the valleys in contact with the shielding layers 33 for the purposes set forth in my Patent No. 2,050,991. The other valleys may contain longitudinal ducts 34 for passage of insulating compound through the cable during the impregnating operation. If desired, one or more insulated wires 44 to be used for signal or control purposes may be included in the valleys or between the conductors. The valleys may be filled out with material 35, for example jute or crushed paper, but desirably only to lines tangent to the shielded conductors so that the overlying impervious integument will have a substantially triangular shape.

The conductors, oil ducts and valley fillers comprising the cable core may, if desired, be held together by a helical wrapping 37 of paper or metal. Enclosing the core is a thin, flexible, impervious integument 38, for example a thin extruded lead sheath. The integument 38 conveniently is protected against wrinkling and other damage by an adherent wrapping 39, which may be similar to the protective covering 24 described above.

Over the protective covering 39 is placed an expansion restraining sheath, which in this embodiment is generally similar to the sheath shown in Figs. 1 and 2. The rubber jacket 40 desirably is applied, as by extrusion, to give an approximately circular outer periphery, with a minimum thickness of perhaps 30 mils. Over this jacket is an open braid 41, and a second rubber jacket 42, and over all there may be a helical wrapping 43 of rubberized cloth tape. The yarn of the braid 41 is applied under tension and at the correct angle to insure necessary energy storage in the sheath. If the braid 41 sinks into the underlying rubber 40 so as to make it impractical to maintain the necessary tension, this difficulty may be overcome by applying a wrapping, (not shown) such as friction tape over the rubber jacket 40 before applying the braid 41. It will be apparent from the foregoing discussion and the disclosure of my Patent No. 2,050,990 that the triangular shaped integument 38 may be readily expanded and restricted by flexing of the material without repeated stretching and compression thereof.

Figs. 5 and 6 show a three conductor cable construction which differs from the construction of Figs. 3 and 4 principally in the expansion restraining sheath. Three conductors 51, illustrated as sector shaped, are enclosed in bodies of impregnated insulation 52, and shielding layers 53. The insulated and shielded conductors are cabled together with longitudinal ducts 54, fillers 55 and an extra conductor 56 in contact with the shielding layers. As shown, the fillers give to the core a substantially circular perimeter. The elements comprising the core may be bound together by a helical wrapping 57, for example a metal tape and a paper tape wrapped simultaneously in overlapping relation. Enclosing the core is a thin, flexible, impervious integument 58, which may be an extruded, thin lead sheath. Desirably the integument has a protective covering 59, which may be generally similar to the coverings 24 in the construction of Figs. 1 and 2.

In this embodiment the expansion restraining sheath comprises a jacket 60 of rubber or similar material, and the helically wrapped wires 61. The number, size, tension and lay of these wires will be determined in the manner described hereinabove. As shown, there are eight wires, (steel) and the lay is approximately 14 times the cable diameter.

In this construction the impervious integument initially is substantially round in shape. Consequently, when the impregnating compound expands during the initial temperature cycle the integument will be stretched slightly, but because of the outer helical wires this will merely give to the integument a somewhat corrugated shape. In subsequent temperature cycles the corrugated integument will flex as the contained volume changes without further permanent stretching or compression of the material thereof.

Figs. 7 and 8 disclose a somewhat different three conductor cable embodying the present invention. The cable core including the thin, flexible, impervious integument is substantially similar to that shown in Figs. 5 and 6. The conductors 71, insulated at 72, and shielded at 73, are cabled together with longitudinal ducts 74, filler material 75 and extra conductor 76. The thin, flexible impervious integument 77 may be an extruded lead sheath.

Over the integument 77 are a plurality of padding or corner members 78 extending longitudinally of the cable. These corner members, four in number in the drawing, desirably are made of some highly elastic material such as rubber, and over them is placed an expansion restraining and energy absorbing sheath. In the drawings the expansion restraining sheath is similar to that shown in Fig. 1, and comprises an overlapping or multiple helical wrapping 79, for example rubberized cloth tape, and rubber jackets 80 and 82 with the embedded open braid 81, for example of cotton yarn.

Since the impervious integument initially is substantially round in shape, the material thereof probably will be stretched slightly in the initial temperature cycle. As the contained volume expands, the expansion restraining sheath tends toward a round shape. In so doing, the corner pieces 78 are placed under increasing pressure and distorted. As the volume contracts the corner pieces under the action of the enclosing sheath tend to resume their original form. Subsequent temperature cycles are accommodated for by a flexing of the material of the integument rather than by further permanent stretching and compression of the material.

Figure 10:
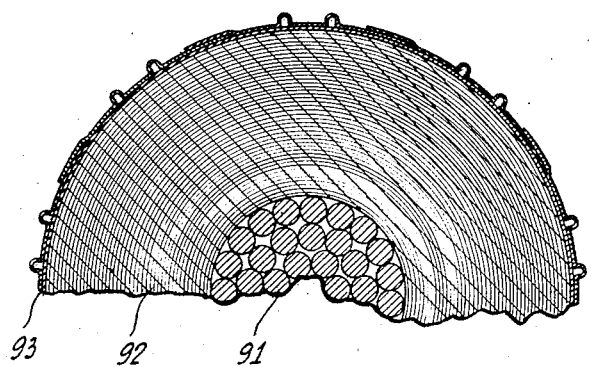
Fig. 10 is a transverse section to enlarged scale substantially on the line 10—10 of Fig. 9.

Figs. 9 and 10 disclose a modified type of impervious integument which may be employed in place of a thin extruded lead sheath. The conductor 91, enclosed in a body 92 of impregnated porous insulation, is surrounded by a thin, flexible impervious integument 93, over which there is an expansion restraining and energy storing sheath 94. The integument comprises a plurality of thin corrugated metal tapes, for example tinned copper, which are wrapped helically over the insulated conductor with a relatively long lay. The overlapping edges of these tapes are soldered together to make the integument impervious. Such an integument may be used in place of the thin lead sheaths in the other illustrative embodiments.

While the illustrative embodiments are directed primarily to multiple conductor cable constructions, it will be obvious that the thin, flexible, impervious integument and the overlying expansion restraining sheath for storing and restoring energy are equally applicable to single conductor cables.

I have discovered and disclosed herein new ways in which available elastic materials may be used as the energy storing and restoring medium for expansible and contractible sheathed cables, and have provided new and improved cable constructions.

It will be understood that my invention is not limited to the illustrative embodiments disclosed, but may be variously modified and embodied within the scope of the subjoined claims.

I claim:

1. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, said integument having an out-of-round contour in any cross section through the cable to permit variation in its enclosed volume merely by flexing of the integument and an expansion-restraining sheath overlying the thin, flexible, impervious integument, said sheath comprising elastic material capable of storing energy as the insulating compound expands and distends the thin, flexible integument and of utilizing the stored energy to constrict the thin, flexible integument as the insulating compound contracts, to maintain the insulating compound under a positive pressure at all times.

2. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, the material of said sheath being relatively unstressed when the cable is without load and capable of storing energy under tension as the thin, flexible integument is distended with rising temperature for again constricting the thin, flexible integument when the temperature falls.

3. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a thin wall of material having a modulus of elasticity in the range of that of vulcanized rubber compounds and a helically applied reinforcing element having a much higher modulus of elasticity, said reinforcing element being of a size and lay proportioned to its modulus of elasticity to accommodate for the expansion and contraction of the cable well within the elastic limits of the element.

4. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a continuous thin wall of material having a modulus of elasticity in the range of that of vulcanized rubber compounds and a reinforcing wrapping of fibrous material having a modulus of elasticity much higher than that of vulcanized rubber compounds, said reinforcing wrapping being of a size and lay proportioned to its modulus of elasticity to accommodate for the expansion and contraction of the cable well within the elastic limits of the fibrous material.

5. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a continuous thin wall of material having a modulus of elasticity in the range of that of vulcanized rubber compounds and a reinforcing wrapping of a size and lay proportioned to its modulus of elasticity to accommodate for the expansion and contraction of the cable within the elastic limits of the reinforcing wrapping.

6. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a thin wall of vulcanized rubber compound and a reinforcing wrapping of fibrous material, said reinforcing wrapping being of a size and lay proportioned to its modulus of elasticity to accommodate for the expansion and contraction of the cable well within the elastic limits of the fibrous material.

7. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a thin wall of vulcanized rubber compound and reinforcing helically wrapped metal wires, the reinforcing wrapping being of a size and lay proportioned to its modulus of elasticity to accommodate for the expansion and contraction of the cable well within the elastic limits of the metal wires.

8. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and a thin expansion-restraining sheath overlying the thin, flexible integument, said sheath comprising a wall of material having a modulus of elasticity in the range of that of vulcanized rubber compounds and reinforcing metal wires spaced circumferentially about the cable and wrapped helically over the elastic wall with a long lay, the reinforcing wrapping being of a size and lay proportioned to its modulus of elasticity to accommodate for the expansion and contraction of the cable well within the elastic limits of the metal wires.

9. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a thin wall of vulcanized rubber compound and helically wrapped fibrous cords embedded therein, said fibrous wrapping being of a size and lay proportioned to its modulus of elasticity to accommodate for the expansion and contraction of the cable well within the elastic limits of the fibrous cords.

10. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a wall of vulcanized rubber compound and one or more wrappings of rubberized cloth tape.

11. In sheathed high tension electric cable having an expansible and contractible sheath to accommodate for changes in the volume of the cable insulation, the combination of a plurality of conductors each enclosed in a body of porous insulating material impregnated with an insulating compound, each insulated conductor having an overlying, closely-adherent, shielding layer pervious to the insulating compound, a thin, impervious, flexible integument enclosing the insulated and shielded conductors, and an expansion-restraining sheath overlying the thin, flexible integument, said sheath comprising a thin wall of material having a modulus of elasticity in the range of that of vulcanized rubber compounds and a reinforcing wrapping of material having a much higher modulus of elasticity, said reinforcing wrapping being of a size and lay proportioned to its modulus of elasticity to accommodate for the expansion and contraction of the cable well within the elastic limits of the wrapping.

12. In sheathed high tension electric cable, the combination of a plurality of sector shaped conductors, each conductor enclosed in a body of porous insulating material impregnated with an insulating compound, thin, flexible, impervious integuments individually enclosing the insulated conductors, the several conductors being cabled together with fillers in the valley spaces, and an expansion-restraining sheath enclosing the assembled conductors and valley fillers, said sheath comprising a thin wall of material having a modulus of elasticity in the range of that of vulcanized rubber compounds and a reinforcing wrapping of material having a much higher modulus of elasticity, said reinforcing wrapping being of a size and lay proportioned to its modulus of elasticity to accommodate for the expansion and contraction of the cable well within the elastic limits of the wrapping.

13. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a wall of vulcanized rubber compound having helically wrapped fibrous cords embedded therein and reinforcing metal wires spaced circumferentially about the cable and wrapped helically over the rubber wall with a long lay.

14. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising a wall of vulcanized rubber compound, one or more wrappings of rubberized cloth tape and reinforcing metal wires spaced circumferentially about the cable and wrapped helically over the rubber wall with a long lay.

15. In sheathed high tension electric cable having an expansible and contractible sheath to accommodate for changes in the volume of the cable insulation, the combination of a plurality of conductors each enclosed in a body of porous insulating material impregnated with an insulating compound, a thin, impervious, flexible integument enclosing the insulated and sheathed conductors, and an expansion restraining sheath overlying the thin, flexible integument, said sheath comprising a thin wall of material having a modulus of elasticity in the range of that of vulcanized rubber compounds and a reinforcing wrapping of material having a much higher modulus of elasticity, said reinforcing wrapping being of a size and lay proportioned to its modulus of elasticity to accommodate for the expansion and contraction of the cable well within the elastic limits of the wrapping material.

16. In sheathed high tension electric cable, the combination of a plurality of conductors, each conductor enclosed in a body of porous insulating material impregnated with an insulating compound, thin, flexible impervious integuments individually enclosing the insulated conductors, the several conductors being cabled together, and an expansion restraining sheath enclosing the assembled conductors, said sheath comprising a wall of material having a modulus of elasticity in the range of that of vulcanized rubber compounds, and reinforcement therefor capable of storing energy as the insulating compound expands and of restoring the energy as the insulating compound contracts.

17. In sheathed high tension electric cable, the combination of a plurality of sector shaped conductors, each conductor enclosed in a body of porous insulating material impregnated with an insulating compound, thin, flexible, impervious integuments individually enclosing the insulated conductors, the several conductors being cabled together, and an expansion-restraining sheath enclosing the assembled conductors, said sheath comprising a thin wall of material having a modulus of elasticity in the range of that of vulcanized rubber compounds and a reinforcing wrapping of material having a much higher modulus of elasticity, said reinforcing wrapping being of a size and lay proportioned to its modulus of elasticity to accommodate for the expansion and contraction of the cable within the elastic limits of the wrapping.

18. In high tension electric cable having an expansible and contractible sheath to accommodate for changes in the volume of the conductor and insulation, the combination of a conductor, an enveloping body of porous insulating material impregnated with an insulating compound, a thin, flexible, impervious integument enclosing the insulated conductor, and an expansion-restraining sheath overlying the thin, flexible integument, said sheath comprising one or more wrappings of rubberized cloth tape and reinforcing metal wires spaced circumferentially about the cable and wrapped helically over the rubberized tape with a long lay.

19. In sheathed high tension electric cable having an expansible and contractible sheath to accommodate for changes in the volume of the cable insulation, the combination of a conductor, an enveloping body of porous insulating material impregnated with an insulating compound, a thin, impervious, flexible integument enclosing the insulated and sheathed conductor, and an expansion-restraining sheath overlying the thin, flexible integument, said sheath comprising a thin wall of material capable of expanding and contracting reversibly to accommodate for changes in the volume of the cable with temperature changes and a reinforcing wrapping, said thin wall and reinforcing wrapping jointly being capable of withstanding hydrostatic pressures occurring within the cable.

RALPH W. ATKINSON.